United States Patent
Oliver et al.

(10) Patent No.: US 7,412,536 B2
(45) Date of Patent: Aug. 12, 2008

(54) METHOD AND SYSTEM FOR A NETWORK NODE FOR ATTACHMENT TO SWITCH FABRICS

(75) Inventors: Neal C. Oliver, Florham Park, NJ (US); David Gish, Riverdale, NJ (US); Gerald Lebizay, Madison, NJ (US); Henry Mitchel, Wayne, NJ (US); Brian Peebles, Cranford, NJ (US); Alan Stone, Morristown, NJ (US)

(73) Assignee: Intel Corporation, Santa Clara, CA (US)

( * ) Notice: Subject to any disclaimer, the term of this patent is extended or adjusted under 35 U.S.C. 154(b) by 1026 days.

(21) Appl. No.: 10/607,790

(22) Filed: Jun. 27, 2003

(65) Prior Publication Data

US 2004/0267948 A1 Dec. 30, 2004

(51) Int. Cl.
*G06F 15/173* (2006.01)
(52) U.S. Cl. .................. 709/238; 709/223; 709/236; 370/395.42
(58) Field of Classification Search ......... 709/223–226, 709/230, 238, 236; 370/395.42
See application file for complete search history.

(56) References Cited

U.S. PATENT DOCUMENTS

| | | | | |
|---|---|---|---|---|
| 5,404,505 A * | 4/1995 | Levinson | ............... | 370/468 |
| 5,463,620 A * | 10/1995 | Sriram | ............... | 370/412 |
| 6,091,717 A * | 7/2000 | Honkasalo et al. | ............... | 370/329 |
| 6,188,698 B1 * | 2/2001 | Galand et al. | ............... | 370/412 |
| 6,526,062 B1 * | 2/2003 | Milliken et al. | ............... | 370/395.42 |
| 6,577,635 B2 * | 6/2003 | Narayana et al. | ............... | 370/395.42 |
| 6,775,719 B1 * | 8/2004 | Leitner et al. | ............... | 370/399 |
| 6,975,638 B1 * | 12/2005 | Chen et al. | ............... | 370/412 |
| 7,181,541 B1 * | 2/2007 | Burton et al. | ............... | 709/250 |
| 2002/0078196 A1 * | 6/2002 | Kim et al. | ............... | 709/224 |
| 2002/0118683 A1 | 8/2002 | Narayana et al. | | |
| 2002/0196784 A1 | 12/2002 | Masuda | | |
| 2003/0058880 A1 * | 3/2003 | Sarkinen et al. | ............... | 370/413 |

FOREIGN PATENT DOCUMENTS

EP 1 294 202 A1 3/2003

OTHER PUBLICATIONS

George Apostolopoulos et al., "Quality of Service Based Routing: A Performance Perspective", 1998 ACM 1-58113-003-1/98/0008, pp. 17-28.

Matthias Bossardt et al., "ABR Architecture and Simulation for an Input-Buffered and PER-VC Queued ATM Switch", 1998 IEEE 0-7803-4984-9/98, pp. 393-398.

(Continued)

*Primary Examiner*—Philip B Tran
(74) *Attorney, Agent, or Firm*—Blakely, Sokoloff, Taylor & Zafman LLP

(57) ABSTRACT

A method and system for a network node for attachment to switch fabrics is described. The system includes an access unit to provide access to communications from an external network, a classification element to label received packets with information identifying an associated flow and queue, a mapping element to place the packets into one of a plurality of queues based on the label identifiers, a scheduler to schedule packets in the queues for transmission, and an encapsulation element to encapsulate the scheduled packets into uniform size frames. The uniform size frames may then be transmitted to a next destination through a switch fabric.

18 Claims, 5 Drawing Sheets

OTHER PUBLICATIONS

Baolo Bostica et al., "Quasimodo- Quality of Service Methodologies and Solutions Within the Service Framework: Measuring, Manganing and Charging QoS", 2001 EURESCOM Participant in Project P906 EDIN 0088-0906, pp. 1-30.

International Telecommunication Union, "Terms and Definitions Related To Quality of Service and Network Performance Including Dependability", Aug. 1994 ITU-T Recommendation E.800, pp. 1-53.

International Telecommunication Union, "B-ISDN Service Aspects", Aug. 1992 ITU-T Recommendation I.211, pp. 1-13.

International Telecommunication Union, "General Aspects of Quality of Service and Network Performance In Digital Networks, Including ISDNs", Mar. 1993 ITU-T Recommendation I.350, pp. 1-13.

International Telecommunication Union, "B-ISDN ATM Layer Cell Transfer Performance", Mar. 2000 ITU-T Recommendation I.356, pp. 1-56.

Andreas Vogel et al., "Distributed Multimedia and QoS: A Survey", 1995 IEEE 1070-986X/95, pp. 10-19.

Mobile Wireless Internet Forum, "IP in the RAN as a Transport Option in 3rd Generation Mobile Systems", Mobile Wireless Internet Forum Technical Report, MTR-006 Release v2.0.0, pp. 1-118, Jun. 2001.

Richard Cam et al., "System Packet Interface Level 3 (SPI-3): OC-48 System Interface for Physical and Link Layer Devices", Optical Internetworking Forum SPI-3, Implementation Agreement: OIF-SPI3-01.0, pp. 1-42, Jun. 2000.

Richard Cam et al., "System Packet Interface Level 4 (SPI-4) Phase 2: OC-192 System Interface for Physical and Link Layer Devices", Optical Internetworking Forum SPI-4 Phase 2, Implementation Agreement: OIF-SPI4-02.0, pp. 1-59, Jan. 2001.

International Telecommunication Union, "Broadband Integrated Services Digital Network (B-ISDN)—Digital Subscriber Signalling System No. 2 (DSS 2)—User-Network Interface (UNI) Layer 3 Specification for Basic Call/Connection Control", Feb. 1995 ITU-T Recommendation Q.2931, pp. 1-249, Feb. 1995.

3rd Generation Partnership Project; Technical Specification Group Radio Access Network; IP Transport in UTRAN; Release 5; 3GPP TR 25.933 V5.0.0 (Mar. 2002), pp. 1-127.

3rd Generation Partnership Project; Technical Specification Group Services and System Aspects; Mandatory Speeech Codec Speech Processing Functions; AMR Speech Codec Frame Structure; Release 4; 3GPP TS 26.101 V4.2.0 (Mar. 2002), pp. 1-19.

3rd Generation Partnership Project; Technical Specification Group Services and System Aspects; QoS Concept and Architecture; Release 5; 3GPP TS 23.107 V5.4.0 (Mar. 2002), pp. 1-40.

Cui-Qing Yang et al.; "A Taxonomy for Congestion Control Algorithms in Packet Switching Networks", Jul./Aug. 1995 IEEE, 0890-8044-95. pp. 34-45.

* cited by examiner

Interconnection of nodes in a multishelf configuration using a vertical mesh

Interconnection of nodes in a multishelf configuration using an external switch

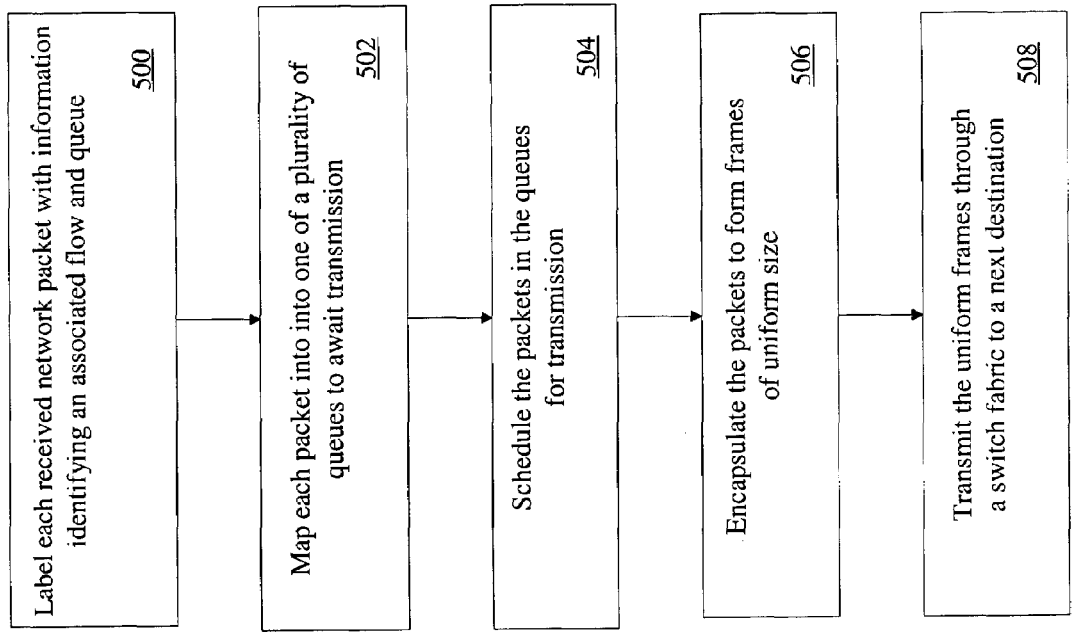

METHOD AND SYSTEM FOR A NETWORK NODE FOR ATTACHMENT TO SWITCH FABRICS

BACKGROUND

1. Technical Field

Embodiments of the invention relate to the field of networking, and more specifically to a network node for attachment to switch fabrics.

2. Background Information and Description of Related Art

Many modern communications applications have demanding resource requirements that are difficult to scale. An effective way to scale such applications is to distribute individual algorithms onto different processing elements and interconnect those processing elements on a switch fabric. This arrangement may support the high-bandwidth data flows that must exist between the algorithms.

A high performance switch fabric arrangement may be achieved by use of various proprietary multi-stage switching technologies, but the performance is achieved at a high cost in dollars and in features, such as scalability. In order to achieve high performance at a reasonable cost, current approaches include the use of network technologies such as Ethernet, InfiniBand, PCI-Express/Advanced Switching, and Rapid IO. However, these network technologies are immature and still evolving and are limited in some features critical to network performance, such as classes of service and congestion control.

BRIEF DESCRIPTION OF DRAWINGS

The invention may best be understood by referring to the following description and accompanying drawings that are used to illustrate embodiments of the invention. In the drawings:

FIG. 5 is a flow diagram illustrating a method according to an embodiment of the invention.

DETAILED DESCRIPTION

Embodiments of a system and method for a network node for attachment to switch fabrics are described. In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
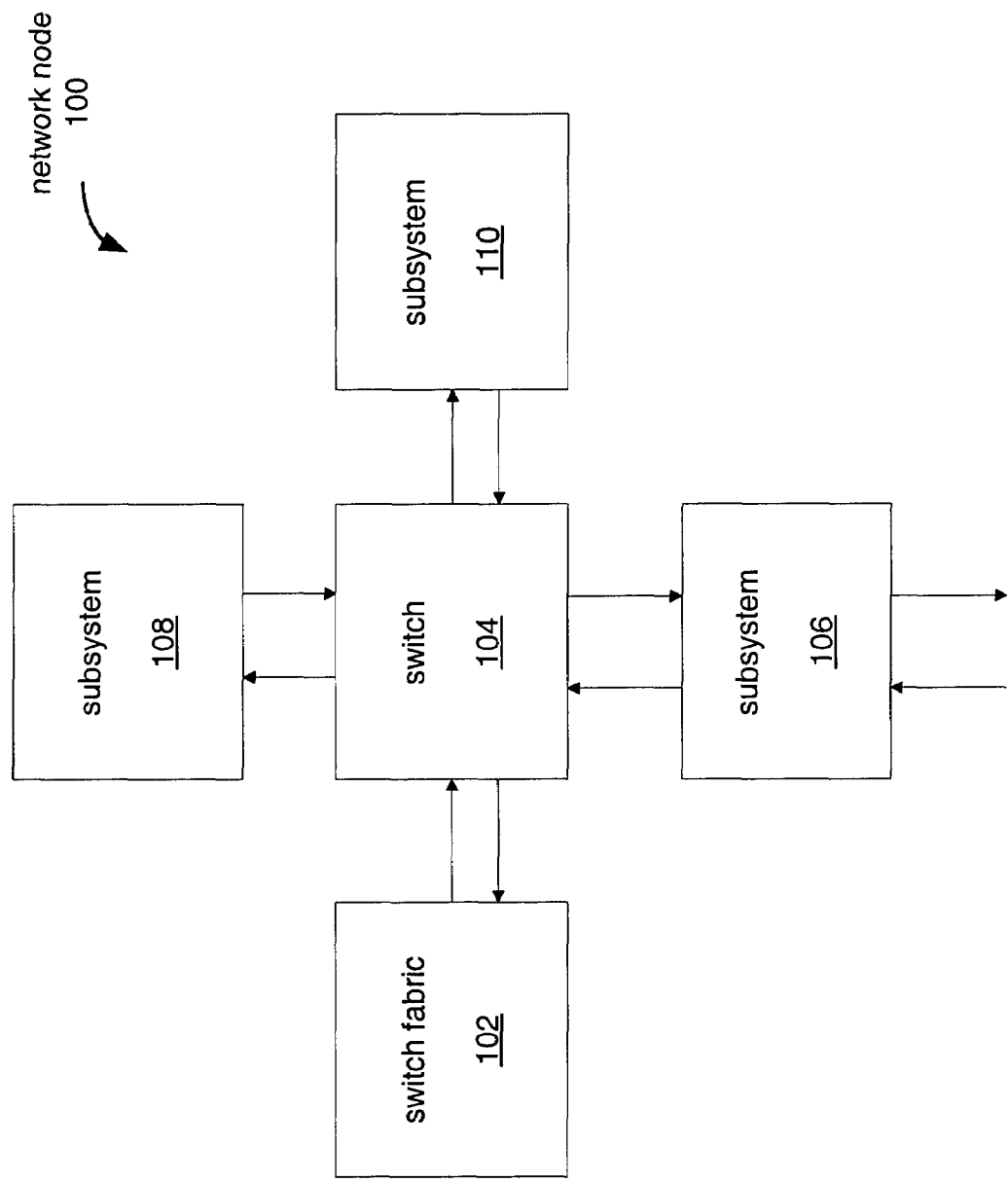
FIG. 1 is a block diagram illustrating one generalized embodiment of a system incorporating the invention.

Referring to FIG. 1, a block diagram illustrates a network node 100 according to one embodiment of the invention. Those of ordinary skill in the art will appreciate that the network node 100 may include more components than those shown in FIG. 1. However, it is not necessary that all of these generally conventional components be shown in order to disclose an illustrative embodiment for practicing the invention.

Network node 100 includes a switch 104 to couple to a switch fabric 102 and a plurality of subsystems, such as 106, 108, and 110. The subsystem 106 is a subsystem at which external traffic, such as ATM virtual circuits, SONET, and Ethernet, enters and exits the network node 100. The subsystem 108 labels each received external packet to identify an associated flow, and classifies each external packet into one of a plurality of queues based on the packet's destination, priority, and path through the switch fabric 102. The subsystem 110 receives labeled and classified packets, maps the packets into the appropriate queue, schedules the packets from each queue for transmission, and encapsulates the packets to form frames of uniform size before transmitting the packets to the switch fabric 102 through switch 104.

In one embodiment, the network node 100 also includes one or more adjunct subsystems that perform various high-touch processing functions, such as deep packet inspection and signal processing. A packet may be routed to an internal or external adjunct subsystem for processing. An adjunct process may be a thread of a network processor core, a thread of a network processor microengine, or a thread of an adjunct processor, such as a digital signal processor (DSP). The adjunct process may be on a local node or an external node.

Figure 2:
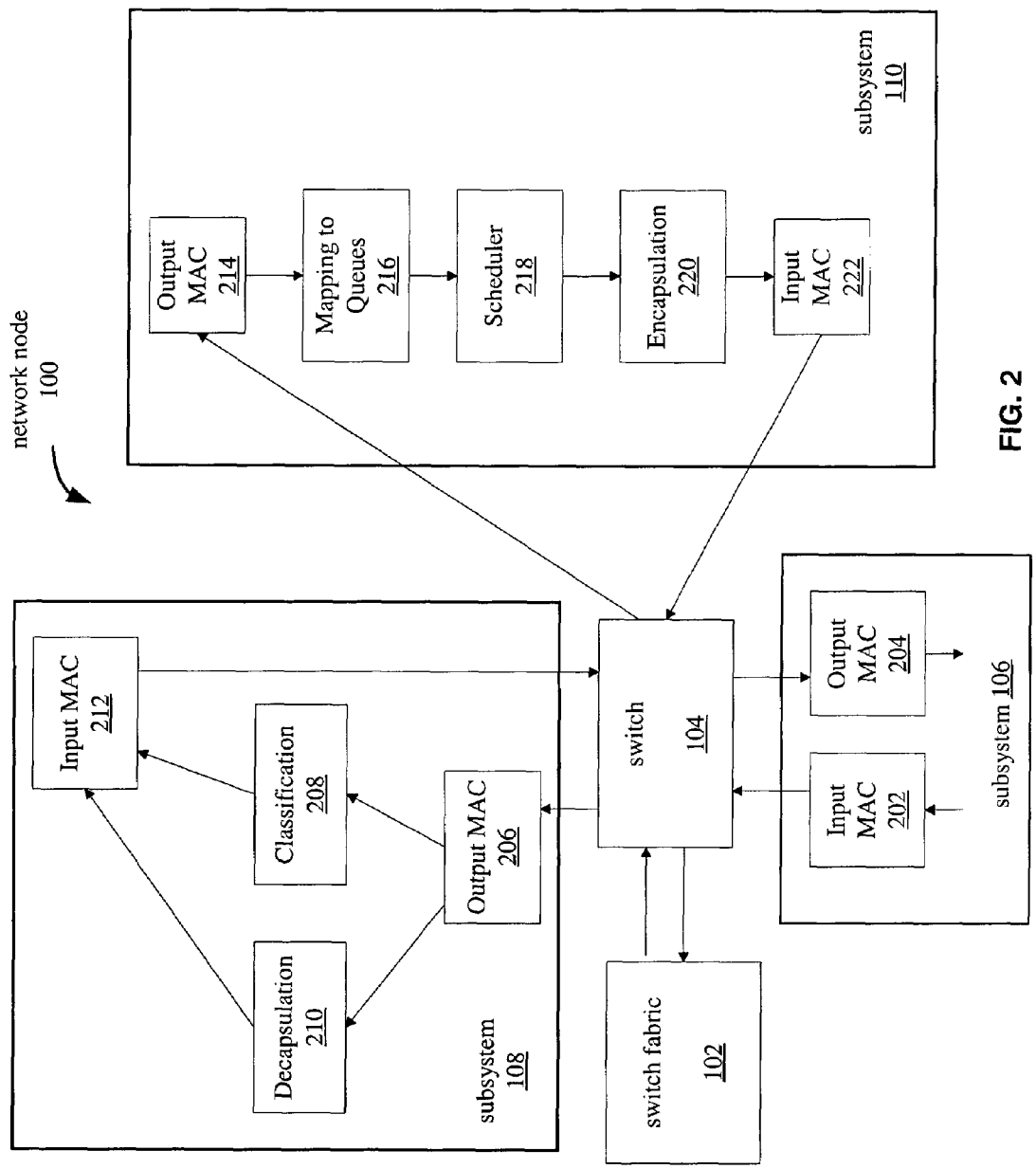
FIG. 2 is a block diagram illustrating one generalized embodiment of a system incorporating the invention in greater detail.

Although the exemplary network node 100 is shown in FIG. 1 and FIG. 2 as including a switch 104 to connect the subsystems and the switch fabric, in one embodiment, the switch 104 could be split into two switches. One of the two switches would be a local switch that connects the various subsystems of the network node. The other of the two switches would be a fabric switch that connects one or more subsystems to the switch fabric.

FIG. 2 illustrates the subsystems of network node 100 in greater detail according to one embodiment of the invention. As shown, subsystem 106 includes an input Media Access Control (MAC) 202 and an output MAC 204 to interface with external networks, such as ATM virtual circuits, SONET, and Ethernet. The subsystem 106 converts incoming data to packet streams, and formats and frames outbound packet streams for the network interface.

The subsystem 108 includes an input MAC 212, an output MAC 206, a classification function 208, and a decapsulation function 210. If an encapsulated frame is received at subsystem 108 from the switch fabric, it is sent to the decapsulation function 210, where the frame is decapsulated into the original packets. If an external packet is received at subsystem 108, then the external packet is sent to the classification function 208 to be labeled and classified.

The classification function 208 examines each external packet and gathers information about the packet for classification. The classification function 208 may examine a packet's source address and destination address, protocols associated with the packet (such as UDP, TCP, RTP, HTML, HTTP), and/or ports associated with the packet. From this information, the classification function 208 determines a particular flow associated with the packet and labels the packet with a flow identifier (ID) to identify the associated flow. The packet may then be classified into one of a plurality of traffic classes, such as voice, email, or video traffic. A path to be taken by the packet through the switch fabric is determined. Load balancing is considered when determining the paths packets will take through the switch fabric. Load balancing refers to selecting different paths for different flows to balance the load on the paths and to minimize the damage that could be done to throughput by a partial network failure.

Each packet is classified into one of a plurality of queues based on the packet's destination, path through the switch fabric, and priority. The packets in a queue have a common destination, path through the switch fabric, and priority. Each packet may be labeled with a queue ID to identify the queue to which the packet has been classified. In one embodiment, packets may be further edited by removing headers and layer encapsulations that are not needed during transmission through the system. After a packet is labeled and classified, it is sent back to switch 104 to be routed to subsystem 110.

The subsystem 110 includes an output MAC 214, an input MAC 222, a mapping element 216, a scheduler 218, and an encapsulation element 220. The mapping element 216 examines each packet and determines which one of a plurality of queues the packet belongs based on packet's label identifiers. The packet is then queued into the appropriate queue to await transmission to a next destination through the switch fabric. The scheduler 218 schedules the packets in the queues for transmission. The scheduler 218 uses various information to schedule packets from the queues. This information may include occupancy statistics, flowspec information configured via an administrative interface, and feedback from switch function. Various algorithms may be used for the scheduling, such as Longest Delay First, Stepwise QoS Scheduler (SQS), Simple Round Robin, and Weighted Round Robin.

After the packets have been dequeued and scheduled for transmission, the scheduler 218 sends the packets to the encapsulation element 220. The encapsulation element 220 transforms the scheduled packets into uniform size frames by aggregating small packets and segmenting large packets. The size of the frame may be determined by the Message Transfer Unit (MTU) of the switch fabric technology used in the system. Small packets may be merged together using multiplexing, while large packets may be divided up using segmentation and reassembly (SAR). The encapsulation also includes conveyance headers that contain information required to decode the frame back into the original packets. The headers may also include a sequence number of packets within a frame to aid in error detection and a color field to indicate whether a flow conforms with its flowspec.

The encapsulated frames are sent to input MAC 222, which translates each frame into a format consistent with the switch fabric technology, and then sends each frame to a switch fabric port consistent with the path selected for the frame. Different switch fabric technologies and implementations may be used in the system, including Ethernet, PCI-Express/Advanced Switching, and InfiniBand technologies.

The following is an example of a path through the network node 100 taken by an external packet received at subsystem 106. The external packet is received from an external network at the input MAC 202 in subsystem 106. The packet is sent to switch 104, which forwards the packet to subsystem 108 for classification. The packet arrives at MAC 206 in subsystem 108, which forwards the packet to the classification function 208. The classification function 208 examines the packet, determines a flow associated with the packet, labels the packet with a flow ID, determines a path to be taken by the packet through the switch fabric, and classifies the packet into one of a plurality of queues. The labeled and classified packet is then sent to MAC 212, which forwards the packet back to switch 104. The switch 104 sends the packet to subsystem 110. The packet arrives at MAC 214 in subsystem 110, which forwards the packet to the mapping element 216. The mapping element 216 examines the packet's label identifiers and determines which one of a plurality of queues the packet belongs. The packet is then queued into the appropriate queue to await transmission to a next destination through the switch fabric. The scheduler 218 schedules the packet in the queue for transmission. When the packet is scheduled for transmission and dequeued, the packet is encapsulated by the encapsulation function 220 into a uniform size frame by aggregating the packet with other packets if the packet is small or segmenting the packet if the packet is large. The frame is then sent to the MAC 222, which translates the frame into a format consistent with the switch fabric technology, and then sends the frame to a switch fabric port consistent with the path selected for the frame. The packet may then arrive at another network node similar to the one from which it was transmitted.

The following is an example of a path through the network node 100 taken by a frame received from the switch fabric 102. The frame is received at the switch 104. The frame is sent to MAC 206 in subsystem 108, which forwards the packet to the decapsulation function 210. The decapsulation function 210 decapsulates the frame into the original one or more packets. The packets are then sent back to the switch 104 to be forwarded locally or externally. For example, the switch may send the packet to an adjunct subsystem for high touch processing or to subsystem 106 to be transmitted to an external network.

Figure 3:
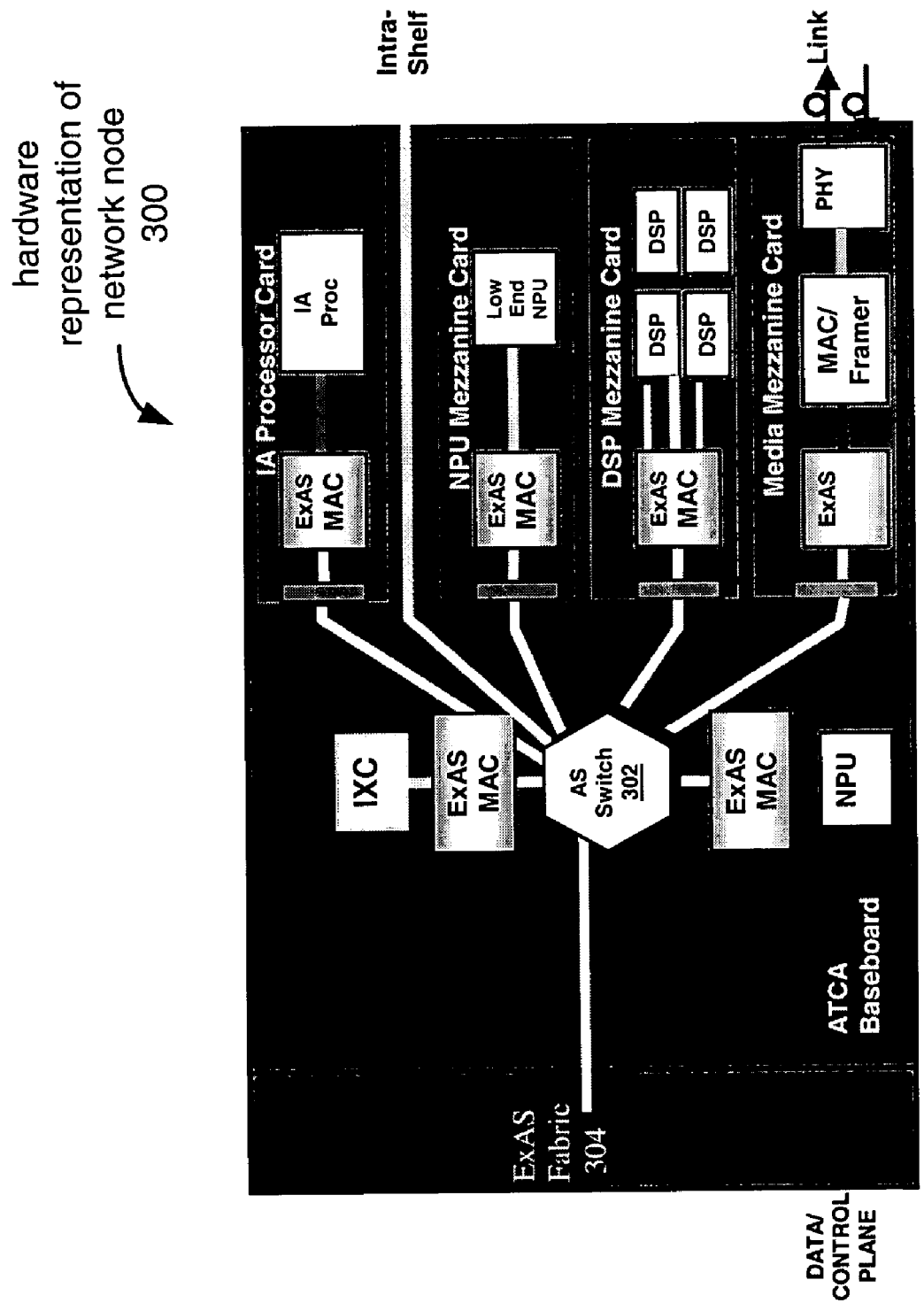
FIG. 3 illustrates a hardware architecture of a network node according to one embodiment of the invention.

FIG. 3 illustrates a hardware representation of a network node 300 according to one embodiment of the invention. The center of the node is a switch 302 that connects the node to the rest of the network via the switch fabric 304, and to various processing elements located on a baseboard and mezzanine boards. A PCI-Express/Advanced Switching Node is used in this exemplary implementation. However, other network technologies, such as Ethernet, and InfiniBand technologies may be used in the network node in other embodiments. In one embodiment, subsystem 106 and an external adjunct subsystem may be located on mezzanine boards while subsystems 108 and 110 and an internal adjunct subsystem are located on the baseboard.

Figure 4B:
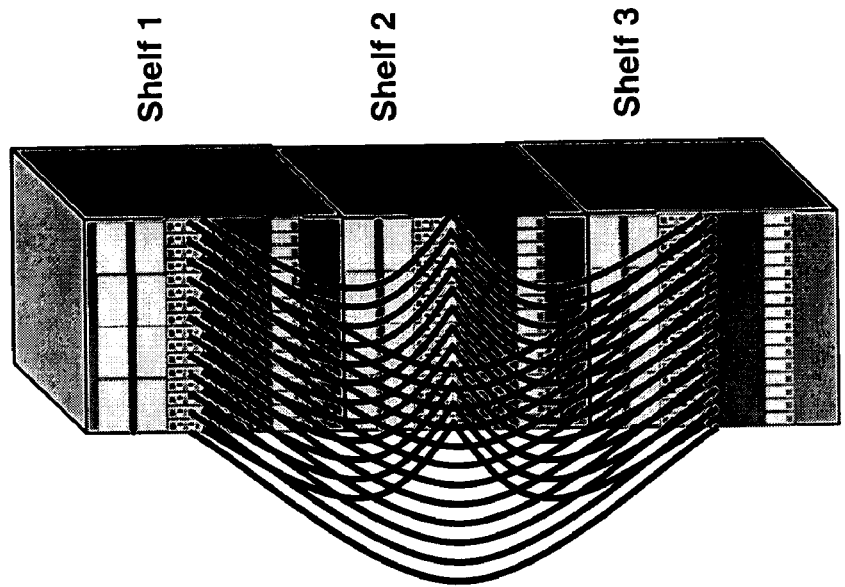
FIG. 4b illustrates an interconnection of nodes in a multi-shelf configuration using a mesh according to one embodiment of the invention.
Figure 4A:
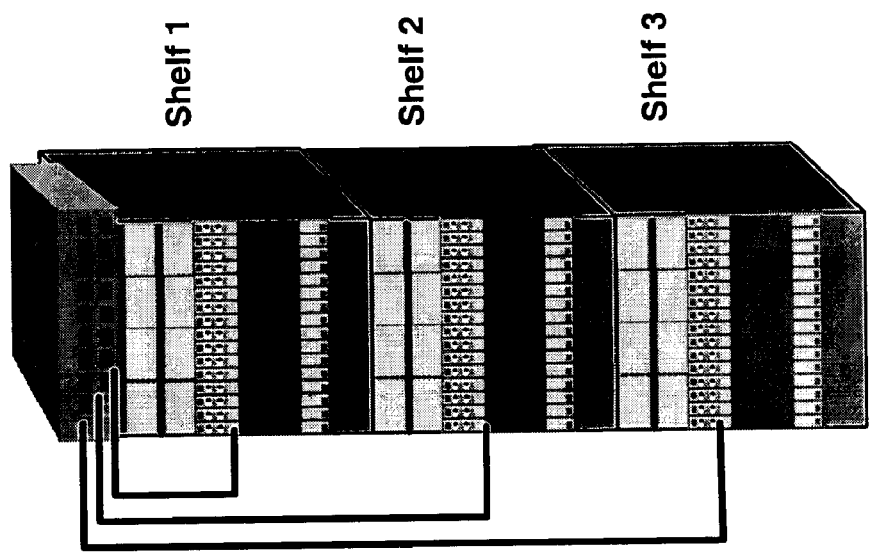
FIG. 4a illustrates an interconnection of nodes in a multi-shelf configuration using an external switch according to one embodiment of the invention.

FIG. 4a illustrates how a network node may be interconnected in a scalable system to additional switching nodes in a network according to one embodiment of the invention. FIG. 4b illustrates how a network node may be interconnected in a scalable system with individual boards connected directly in a mesh according to one embodiment of the invention. Every board need not be connected vertically, and other mesh arrangements may be used to connect the boards in other embodiments of the invention.

FIG. 5 illustrates a method according to one embodiment of the invention. At 500, each received network packet is labeled with information identifying an associated flow and a queue in which the packet will await transmission. In one embodiment, the flow associated with the packet is determined based on the source address, destination address, ports, and/or protocols associated with the packet. In one embodiment, the traffic class to which the packet belongs is determined. In one embodiment, header information and/or layer encapsulations are removed from the packet. At 502, each packet is placed into one of a plurality of queues to await transmission based on the packet's label identifiers. At 504, the packets in the queues are scheduled for transmission. At 506, the scheduled packets are encapsulated to form frames of uniform size by grouping small packets and segmenting large packets. In one embodiment, headers are added that contain information to decode each frame back into the original packets. In one embodiment, small packets are merged to form one frame using multiplexing. In one embodiment, large packets are divided up and placed into multiple frames using segmentation and reassembly. At 508, the uniform frames are transmitted through a switch fabric to a next destination. In one embodiment, when the frames are received at another network node, each frame is decapsulated into the original packets.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    labeling each received network packet with information identifying an associated flow and a queue in which the packet will await transmission;
    mapping each packet into one of a plurality of queues to await transmission based on the packet's label identifiers;
    scheduling the packets in the queues for transmission;
    encapsulating the packets to form frames of uniform size; and
    transmitting the uniform frames through a switch fabric to a next destination,
    wherein the labeling is performed by a first subsystem and the mapping, scheduling, and encapsulating are performed by a second subsystem, the first and second subsystems interconnected via a switch coupled to a switch fabric, wherein the first and second subsystems are disposed either on a baseboard or on the baseboard and one or more mezzanine cards coupled to the baseboard.

2. The method of claim 1, further comprising decapsulating a received frame of encapsulated packets.

3. The method of claim 1, wherein labeling each packet to identify an associated flow and a queue in which the packet will await transmission comprises determining a flow associated with the packet based on the packet's source address and destination address.

4. The method of claim 3, wherein labeling each packet to identify an associated flow and a queue in which the packet will await transmission comprises determining a flow associated with the packet based on protocols associated with the packet.

5. The method of claim 1, wherein labeling each packet to identify an associated flow and a queue in which the packet will await transmission comprises determining a traffic class to which the packet belongs.

6. The method of claim 1, wherein encapsulating the packets to form frames of uniform size comprises encapsulating the packets to form frames of uniform size and adding headers that contain information for decoding each frame back into packets.

7. The method of claim 1, wherein encapsulating packets to form frames of uniform size comprises encapsulating packets to form frames of uniform size by merging multiple packets into one frame using multiplexing.

8. The method of claim 1, wherein encapsulating packets to form frames of uniform size comprises encapsulating packets to form frames of uniform size by segmenting a packet and placing the packet segments into multiple frames using segmentation and reassembly.

9. An apparatus comprising:
    a classification element to label packets received from a network with information identifying an associated flow and queue;
    a mapping element coupled to the classification element to place the packets into one of a plurality of queues based on the packet's label identifiers;
    a scheduler coupled to the mapping element to schedule the packets in the queues for transmission; and
    an encapsulation element coupled to the scheduler to encapsulate the scheduled packets into uniform size frames before the packets are transmitted through a switch fabric to a next destination,
    wherein the classification element is coupled to the mapping element, the scheduler, and the encapsulation element via a switch for coupling to a switch fabric,
    wherein the classification element, the mapping element, the scheduler, and the encapsulation element are disposed within a single network node.

10. The apparatus of claim 9, further comprising an access unit coupled to the classification element through the switch to provide access to communications from the network.

11. The apparatus of claim 9, further comprising an adjunct unit to perform signal processing functions.

12. The apparatus of claim 9, wherein the switch is coupled to the encapsulation element to transmit the scheduled packets to the next destination through the switch fabric.

13. A system comprising:
    an access unit to provide access to communications from a network;
    a switch coupled to the access unit to receive and transmit packets;
    a classification element coupled to the switch to label packets received from the network with information identifying an associated flow and queue;
    a mapping element coupled to the classification element via the switch to place the packets into one of a plurality of queues based on the label identifiers;
    a scheduler coupled to the mapping element to schedule the packets in the queues for transmission to a next destination;
    an encapsulation element coupled to the scheduler to encapsulate the scheduled packets into uniform size frames; and
    a switch fabric coupled to the switch through which scheduled encapsulated packets are transmitted to the next destination, wherein the classification element, the mapping element, the scheduler, and the encapsulation element are disposed within a single network node.

14. The system of claim 13, further comprising an adjunct unit coupled to the switch to perform digital signal processing (DSP) functions.

15. The system of claim 13, wherein the switch is a PCI-Express/Advanced Switching switch.

16. The system of claim 13, wherein the switch fabric is a PCI-Express/Advance Switching fabric.

17. The system of claim 13, wherein the switch fabric is an Ethernet fabric.

18. The system of claim 13, wherein the switch fabric is an InfiniBand fabric.

* * * * *